(12) United States Patent
Otsuka

(10) Patent No.: US 8,953,051 B2
(45) Date of Patent: Feb. 10, 2015

(54) IMAGING DEVICE AND IMAGING METHOD

(71) Applicant: JVC KENWOOD Corporation, Yokohama-shi (JP)

(72) Inventor: Shintaro Otsuka, Yokohama (JP)

(73) Assignee: JVC KENWOOD Corporation (JP)

( * ) Notice: Subject to any disclaimer, the term of this patent is extended or adjusted under 35 U.S.C. 154(b) by 0 days.

(21) Appl. No.: 14/036,301

(22) Filed: Sep. 25, 2013

(65) Prior Publication Data

US 2014/0092262 A1    Apr. 3, 2014

(30) Foreign Application Priority Data

Sep. 28, 2012  (JP) ................. 2012-216320

(51) Int. Cl.
*H04N 5/225*    (2006.01)
*H04N 5/232*    (2006.01)
(52) U.S. Cl.
CPC ....... *H04N 5/23222* (2013.01); *H04N 5/23206* (2013.01)
USPC .................................... 348/207.1

(58) Field of Classification Search
USPC ....................................................... 348/207.1
See application file for complete search history.

(56) References Cited

FOREIGN PATENT DOCUMENTS

JP        2005026866        1/2005

*Primary Examiner* — Usman Khan
(74) *Attorney, Agent, or Firm* — Cantor Colburn LLP

(57) ABSTRACT

A transmission unit of the imaging device transmits a captured image via a network. A reception unit receives instructions to change a view angle from another device via the network. A view angle changing unit changes the view angle on the basis of the instructions to change a view angle which are received from the reception unit. A view angle changing instruction information storage unit stores view angle changing instruction information. A failure monitoring unit detects that a failure occurred in communication with the another device. A control unit instructs the view angle changing unit to change the view angle on the basis of the view angle changing instruction information stored in the view angle changing instruction information storage unit, according to the detection of the failure monitoring unit. An image storage unit stores the captured image.

5 Claims, 16 Drawing Sheets

FIG. 6A

|  | PANNING ANGLE | TILTING ANGLE | FOCAL DISTANCE OF ZOOM LENS | HOLDING TIME |
|---|---|---|---|---|
| No. 1 | p1 | t1 | z1 | T1 |
| No. 2 | p2 | t2 | z2 | T2 |
| No. 3 | p3 | t3 | z3 | T3 |

FIG. 6B

| PANNING START ANGLE | PANNING END ANGLE | TILTING ANGLE | FOCAL DISTANCE OF ZOOM LENS | AUTO PANNING DRIVING SPEED |
|---|---|---|---|---|
| ps | pe | tt | zz | d |

FIG. 10A

| PANNING ANGLE | TILTING ANGLE | FOCAL DISTANCE OF ZOOM LENS | RECEPTION TIME |
|---|---|---|---|
| p1001 | t1001 | z1001 | T1001 |
| p1002 | t1002 | z1002 | T1002 |
| p1003 | t1003 | z1003 | T1003 |
| p1004 | t1004 | z1004 | T1004 |
| p1005 | t1005 | z1005 | T1005 |
| p1006 | t1006 | z1006 | T1006 |
| p1007 | t1007 | z1007 | T1007 |
| p1008 | t1008 | z1008 | T1008 |
| p1009 | t1009 | z1009 | T1009 |
| p1010 | t1010 | z1010 | T1010 |
| p1011 | t1011 | z1011 | T1011 |

FIG. 10B

| | PANNING ANGLE | TILTING ANGLE | FOCAL DISTANCE OF ZOOM LENS | HOLDING TIME |
|---|---|---|---|---|
| No. 1 | p1001 | t1001 | z1001 | T1002-T1001 |
| No. 2 | p1002 | t1002 | z1002 | T1003-T1002 |
| No. 3 | p1003 | t1003 | z1003 | T1004-T1003 |
| No. 4 | p1004 | t1004 | z1004 | T1005-T1004 |
| No. 5 | p1005 | t1005 | z1005 | T1006-T1005 |
| No. 6 | p1006 | t1006 | z1006 | T1007-T1006 |
| No. 7 | p1007 | t1007 | z1007 | T1008-T1007 |
| No. 8 | p1008 | t1008 | z1008 | T1009-T1008 |
| No. 9 | p1009 | t1009 | z1009 | T1010-T1009 |
| No. 10 | p1010 | t1010 | z1010 | T1011-T1010 |

FIG. 11A

| PANNING DRIVING DIRECTION | PANNING DRIVING SPEED | TILTING DRIVING DIRECTION | TILTING DRIVING SPEED | ZOOM LENS DRIVING DIRECTION | ZOOM LENS DRIVING SPEED | PANNING ANGLE | TILTING ANGLE | FOCAL DISTANCE OF ZOOM LENS | INSTRUCTION TIME |
|---|---|---|---|---|---|---|---|---|---|
| RIGHT | 30 DEGREES /SECOND | | | | | p1101 | t1101 | z1101 | T1101 |
| | | + | 30 DEGREES /SECOND | | | p1102 | t1102 | z1102 | T1102 |
| | | | | + | 3 | p1103 | t1103 | z1103 | T1103 |
| | | | | − | 10 | p1104 | t1104 | z1104 | T1104 |
| RIGHT | 30 DEGREES /SECOND | | | | | p1105 | t1105 | z1105 | T1105 |
| | | − | 5 DEGREES /SECOND | | | p1106 | t1106 | z1106 | T1106 |
| | | | | + | 3 | p1107 | t1107 | z1107 | T1107 |
| RIGHT | 30 DEGREES /SECOND | | | | | p1108 | t1108 | z1108 | T1108 |
| | | + | 30 DEGREES /SECOND | | | p1109 | t1109 | z1109 | T1109 |
| | | | | + | 3 | p1110 | t1110 | z1110 | T1110 |
| | | | | − | 10 | | | | |

FIG. 11B

| | PANNING ANGLE | TILTING ANGLE | FOCAL DISTANCE OF ZOOM LENS | PANNING DRIVING DIRECTION | PANNING DRIVING SPEED | TILTING DRIVING DIRECTION | TILTING DRIVING SPEED | ZOOM LENS DRIVING DIRECTION | ZOOM LENS DRIVING SPEED | HOLDING TIME |
|---|---|---|---|---|---|---|---|---|---|---|
| No. 1 | p1101 | t1101 | z1101 | | | | | | | 0 |
| No. 2 | | | | RIGHT | 30 DEGREES /SECOND | | | | | T1002-T1001 |
| No. 3 | | | | | | + | 30 DEGREES /SECOND | | | T1003-T1002 |
| No. 4 | | | | | | | | + | 3 | T1004-T1003 |
| No. 5 | | | | | | | | − | 10 | T1005-T1004 |
| No. 6 | | | | RIGHT | 30 DEGREES /SECOND | | | | | T1006-T1005 |
| No. 7 | | | | | | − | 5 DEGREES /SECOND | + | 3 | T1007-T1006 |
| No. 8 | | | | RIGHT | 30 DEGREES /SECOND | | | | | T1008-T1007 |
| No. 9 | | | | | | + | 30 DEGREES /SECOND | | | T1009-T1008 |
| No. 10 | | | | | | | | + | 3 | T1010-T1009 |

FIG. 12A

| PANNING DRIVING DIRECTION | PANNING DRIVING SPEED | TILTING DRIVING DIRECTION | TILTING DRIVING SPEED | ZOOM LENS DRIVING DIRECTION | ZOOM LENS DRIVING SPEED | INSTRUCTION TIME |
|---|---|---|---|---|---|---|
| RIGHT | 30 DEGREES /SECOND | | | | | T901 |
| | | + | 30 DEGREES /SECOND | | | T902 |
| | | | | + | 3 | T903 |
| | | | | − | 10 | T904 |
| RIGHT | 30 DEGREES /SECOND | | | | | T905 |
| | | − | 5 DEGREES /SECOND | + | 3 | T906 |
| RIGHT | 30 DEGREES /SECOND | | | | | T907 |
| | | + | 30 DEGREES /SECOND | | | T908 |
| | | | | + | 3 | T909 |
| | | | | − | 10 | T910 |

FIG. 12B

| | PANNING ANGLE | TILTING ANGLE | FOCAL DISTANCE OF ZOOM LENS | TIME |
|---|---|---|---|---|
| No. 1 | p1201 | t1201 | z1201 | 13:24:48 |
| No. 2 | p1202 | t1201 | z1201 | 13:24:49 |
| No. 3 | p1203 | t1201 | z1201 | 13:24:50 |
| No. 4 | p1204 | t1201 | z1201 | 13:24:51 |
| No. 5 | p1205 | t1201 | z1201 | 13:24:52 |
| No. 6 | p1205 | t1202 | z1201 | 13:24:53 |
| No. 7 | p1205 | t1203 | z1201 | 13:24:54 |
| No. 8 | p1205 | t1204 | z1201 | 13:24:55 |
| No. 9 | p1205 | t1205 | z1201 | 13:24:56 |
| No. 10 | p1205 | t1205 | z1202 | 13:24:57 |
| No. 11 | p1205 | t1205 | z1203 | 13:24:58 |
| No. 12 | p1205 | t1205 | z1204 | 13:24:59 |
| No. 13 | p1205 | t1205 | z1205 | 13:25:00 |
| No. 14 | p1205 | t1205 | z1206 | 13:25:01 |
| No. 15 | p1205 | t1205 | z1207 | 13:25:02 |

FIG. 12C

| | PANNING ANGLE | TILTING ANGLE | FOCAL DISTANCE OF ZOOM LENS | TIME |
|---|---|---|---|---|
| No. 1 | p1201 | t1201 | z1201 | 00:00:00 |
| No. 2 | p1202 | t1201 | z1201 | 00:00:01 |
| No. 3 | p1203 | t1201 | z1201 | 00:00:02 |
| No. 4 | p1204 | t1201 | z1201 | 00:00:03 |
| No. 5 | p1205 | t1201 | z1201 | 00:00:04 |
| No. 6 | p1205 | t1202 | z1201 | 00:00:05 |
| No. 7 | p1205 | t1203 | z1201 | 00:00:06 |
| No. 8 | p1205 | t1204 | z1201 | 00:00:07 |
| No. 9 | p1205 | t1205 | z1201 | 00:00:08 |
| No. 10 | p1205 | t1205 | z1202 | 00:00:09 |
| No. 11 | p1205 | t1205 | z1203 | 00:00:10 |
| No. 12 | p1205 | t1205 | z1204 | 00:00:11 |
| No. 13 | p1205 | t1205 | z1205 | 00:00:12 |
| No. 14 | p1205 | t1205 | z1206 | 00:00:13 |
| No. 15 | p1205 | t1205 | z1207 | 00:00:14 |

IMAGING DEVICE AND IMAGING METHOD

CROSS-REFERENCE TO RELATED PATENT APPLICATIONS

This application claims the benefit of Japanese Patent Application No. 2012-216320, filed on Sep. 28, 2012, in the Japan Patent Office, the disclosure of which is incorporated herein in its entirety by reference.

BACKGROUND OF THE INVENTION

1. Field of the Invention

The present invention relates to an imaging device that performs a communication via a network, and an imaging method.

2. Description of the Related Art

In the related art, monitoring systems are known which transmit an image captured by a network camera via a network, browse the transmitted image using a browsing terminal, and perform a recording. In such monitoring systems, if a failure occurs in the network, the captured image cannot be browsed, and the recording cannot be performed. Therefore, a network camera has been suggested which records the captured image in the network camera when the failure that occurred in the network is detected, and transmits the recorded image via a network when the failure that occurred in the network is removed (for example, refer to Patent Document 1).

Incidentally, when an operator performs a manual monitoring that performs a monitoring while changing a view angle via a network, by using a PTZ camera that may change a view angle by changing an angle in a horizontal direction (panning), changing an angle in a vertical direction (tilting), and changing a focal distance of a zoom lens (zooming) (hereinafter, simply referred to as "PTZ"), if a failure occurs in the network, the operator may not change the view angle. Accordingly, the network camera of Patent Document 1 records a captured image having the same view angle all the time. In this manner, the network camera of the related art has a problem that an appropriate image may not be recorded when a failure occurs in a network.

(Patent Document 1) Japanese Laid-Open Patent Publication No. 2005-26866

SUMMARY OF THE INVENTION

The present invention provides a technique that may record an appropriate image even when a failure occurs in a network.

According to an aspect of the present invention, provided is an imaging device including an imaging unit which captures an image; a transmission unit which transmits the image captured by the imaging unit via a network; a reception unit which receives instructions to change a view angle of the imaging unit, from another device via the network; a view angle changing unit which changes the view angle of the imaging unit, on the basis of the instructions to change a view angle, which is received by the reception unit; a view angle changing instruction information storage unit which stores view angle changing instruction information for instructing a change in view angle; a failure monitoring unit which detects that a failure occurred in communication with the other device; a control unit which instructs the view angle changing unit to change the view angle of the imaging unit on the basis of the view angle changing instruction information stored in the view angle changing instruction information storage unit, if it is detected that a failure occurred in communication with the other device as a result of the detection of the failure monitoring unit; and an image storage unit which stores the image captured by the imaging unit, if it is detected that a failure occurred in communication with the other device as a result of the detection of the failure monitoring unit.

According to another aspect of the present invention, provided is an imaging method including: an image capture step of capturing an image; a transmission step of transmitting the image captured in the image capture step via a network; a reception step of receiving instructions to change a view angle in the image capture step, from another device via the network; a first view angle changing step of changing the view angle in the image capture step, on the basis of the instructions to change a view angle which are received in the reception step; a view angle changing instruction information storage step of storing view angle changing instruction information for instructing to change a view angle; a failure monitoring step of detecting that a failure occurred in communication with the other device; a second view angle changing step of changing the view angle in the image capture step on the basis of the view angle changing instruction information stored in the view angle changing instruction information storage step, if it is detected that a failure occurred in communication with the other device as a result of the detection in the failure monitoring step; and an image storage step of storing the image captured in the image capture step, if it is detected that a failure occurred in communication with the other device as a result of the detection in the failure monitoring step.

BRIEF DESCRIPTION OF THE DRAWINGS

The above and other features and advantages of the present invention will become more apparent by describing in detail exemplary embodiments thereof with reference to the attached drawings in which:

FIG. 6A and FIG. 6B show an example of an instruction to change a view angle in the network camera according to an embodiment of the present invention;

FIG. 10A and FIG. 10B show the first example of a cyclic sequence when a failure occurs in the network camera according to an embodiment of the present invention;

FIG. 11A and FIG. 11B show the second example of a cyclic sequence when a failure occurs in the network camera according to an embodiment of the present invention; and FIG. 12A through FIG. 12C show the third example of a cyclic sequence when a failure occurs in the network camera according to an embodiment of the present invention;

DETAILED DESCRIPTION OF THE INVENTION

Hereinafter, a network camera according to an embodiment of an imaging device of the present invention will be described with reference to the accompanying drawings.

[Configuration of Network Camera]

Figure 1:
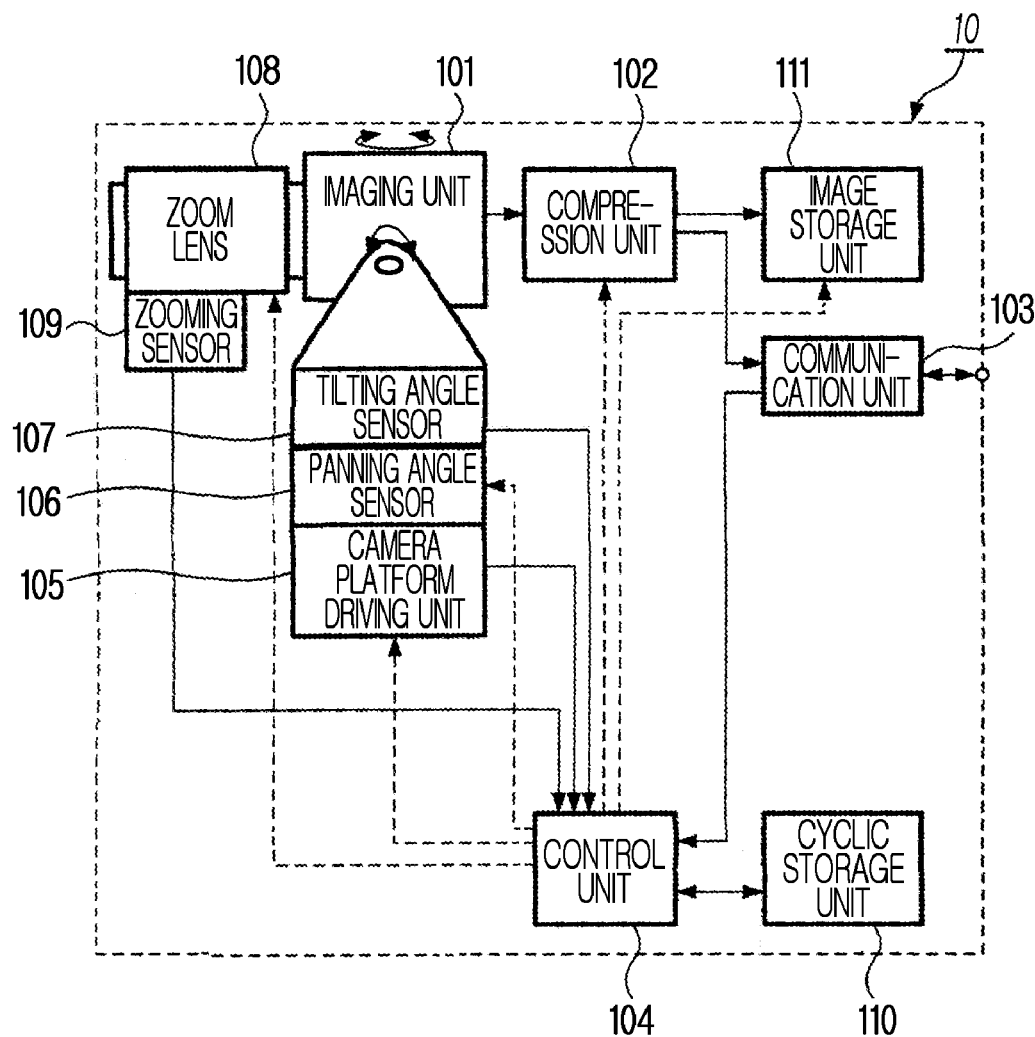
FIG. 1 is a block diagram showing a configuration of a network camera according to an embodiment of an imaging device of the present invention.

FIG. 1 is a block diagram showing a configuration of a network camera 10 according to an embodiment of an imaging device of the present invention. The network camera 10 according to the present embodiment transmits a captured image via a network and changes an imaging direction in response to a control signal that is received via the network.

An imaging unit 101 captures an image of an object around it, and transmits the captured image to a compression unit 102. The compression unit 102 digitally compresses the image captured by the imaging unit 101 into, for example, a Joint Photographic Experts Group (JPEG) format or a Moving Picture Experts Group (MPEG)-4 format, and transmits the compressed image to a communication unit 103 and an image storage unit 111.

A panning angle sensor 106 outputs an angle in a horizontal direction of an imaging direction of the imaging unit 101 as panning data. The tilting angle sensor 107 outputs an angle in a vertical direction of the imaging direction of the imaging unit 101 as tilting data. A zooming sensor 109 outputs data indicating a focal distance of a zoom lens 108 as zooming data.

The communication unit 103 transmits captured image data, panning data, tilting instruction data, and zooming data that are compressed by the compression unit 102 to a camera control terminal 20 in accordance with requirements. The communication unit 103 also receives panning instruction data, tilting instruction data, and zooming instruction data that are transmitted from the camera control terminal 20 and transmits the received data to a control unit 104.

The control unit 104 transmits a control signal for causing a camera platform driving unit 105 to perform panning or tilting, on the basis of the panning instruction data, the tilting instruction data, and the zooming instruction data that are received by the communication unit 103, and transmits a control signal for zoom driving to the zoom lens 108. The control unit 104 simultaneously transmits the panning instruction data, the tilting instruction data, and the zooming instruction data to a cyclic storage unit 110. The cyclic storage unit 110 records the panning instruction data, the tilting instruction data, and the zooming instruction data that are transmitted from the control unit 104.

The camera platform driving unit 105 causes the imaging unit 101 to perform panning or tilting in response to the control signal transmitted from the control unit 104 to change an imaging direction.

The zoom lens 108 performs zoom driving in response to the control signal transmitted from the control unit 104 to change a focal distance.

The image storage unit 111 records the captured image data that is compressed by the compression unit 102, in response to the instruction of the control unit 104.

[Configuration of Camera Control Terminal]

Figure 2:
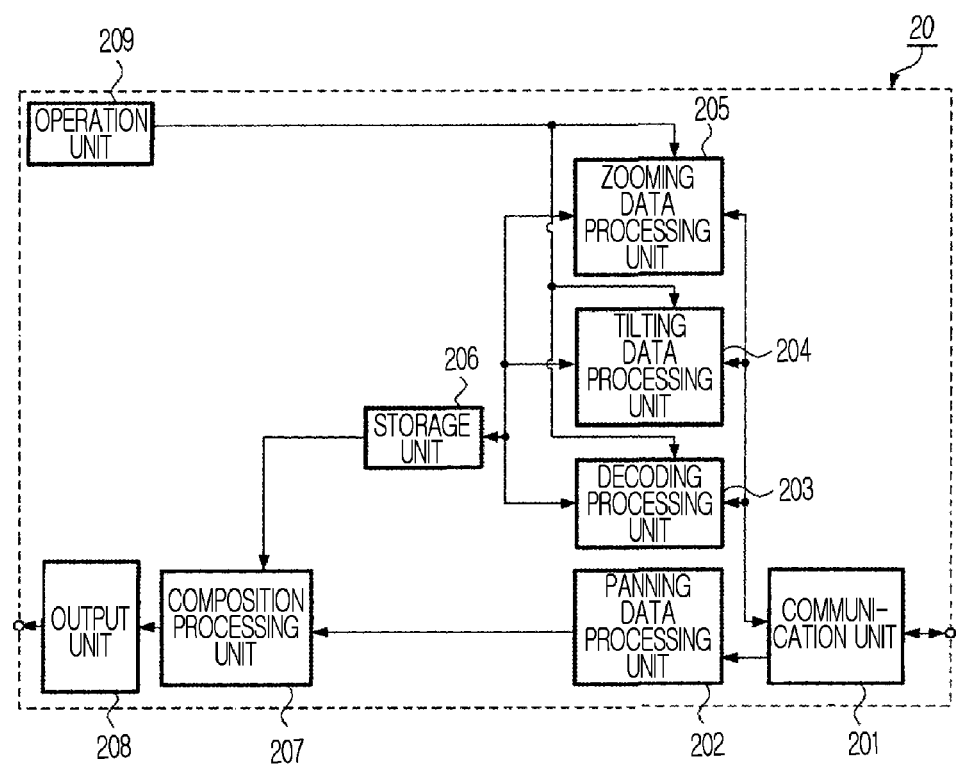
FIG. 2 is a block diagram showing a configuration of a camera control terminal that controls the network camera according to an embodiment of the present invention.

The camera control terminal 20 for controlling the network camera 10 of the present embodiment will be described with reference to FIG. 2. FIG. 2 is a block diagram showing a configuration of the camera control terminal 20. The camera control terminal 20 is a terminal in which application software for controlling is installed in, for example, a general-purpose personal computer, and is a terminal via which an image captured by the network camera 10 is browsed or that controls the network camera 10.

In the camera control terminal 20, a communication unit 201 receives captured image data, zooming data, panning data, and tilting data that are transmitted from the network camera 10. The communication unit 201 also transmits the panning instruction data, the tilting instruction data, and the zooming instruction data to the network camera 10.

A decoding processing unit 202 decodes the captured image data that is digitally compressed into a JPEG format or an MPEG-4 format, which is received from the communication unit 201, and transmits the decoded data to a composition processing unit 207.

A panning data processing unit 203 obtains panning data from the network camera 10 through the communication unit 201 and transmits the panning data to a storage unit 206. The panning data processing unit 203 calculates the panning instruction data for causing panning to be performed, from the input from an operation unit 209 and the data of the storage unit 206, and transmits the calculated data to the communication unit 201.

A tilting data processing unit 204 obtains tilting data from the network camera 10 through the communication unit 201 and transmits the obtained data to the storage unit 206. The tilting data processing unit 204 also calculates tilting instruction data for causing tilting to be performed, from the input from the operation unit 209 and the data of the storage unit 206, and transmits the calculated data to the communication unit 201.

A zooming data processing unit 205 transmits zooming data obtained through the communication unit 201 to the storage unit 206. The zooming data processing unit 205 also calculates zooming instruction data for causing zooming to be performed, from the input from the operation unit 209 and the data of the storage unit 206, and transmits the calculated data to the communication unit 201.

The storage unit 206 is constituted by a semiconductor memory, a hard disk drive, or the like, and stores map data, camera position data, and a camera icon in advance. The map data is data of a map indicating the entire area of a store or the like which is monitored by the network camera installed. The camera position data is data indicating a position of the network camera 10 on a map.

Figure 4:
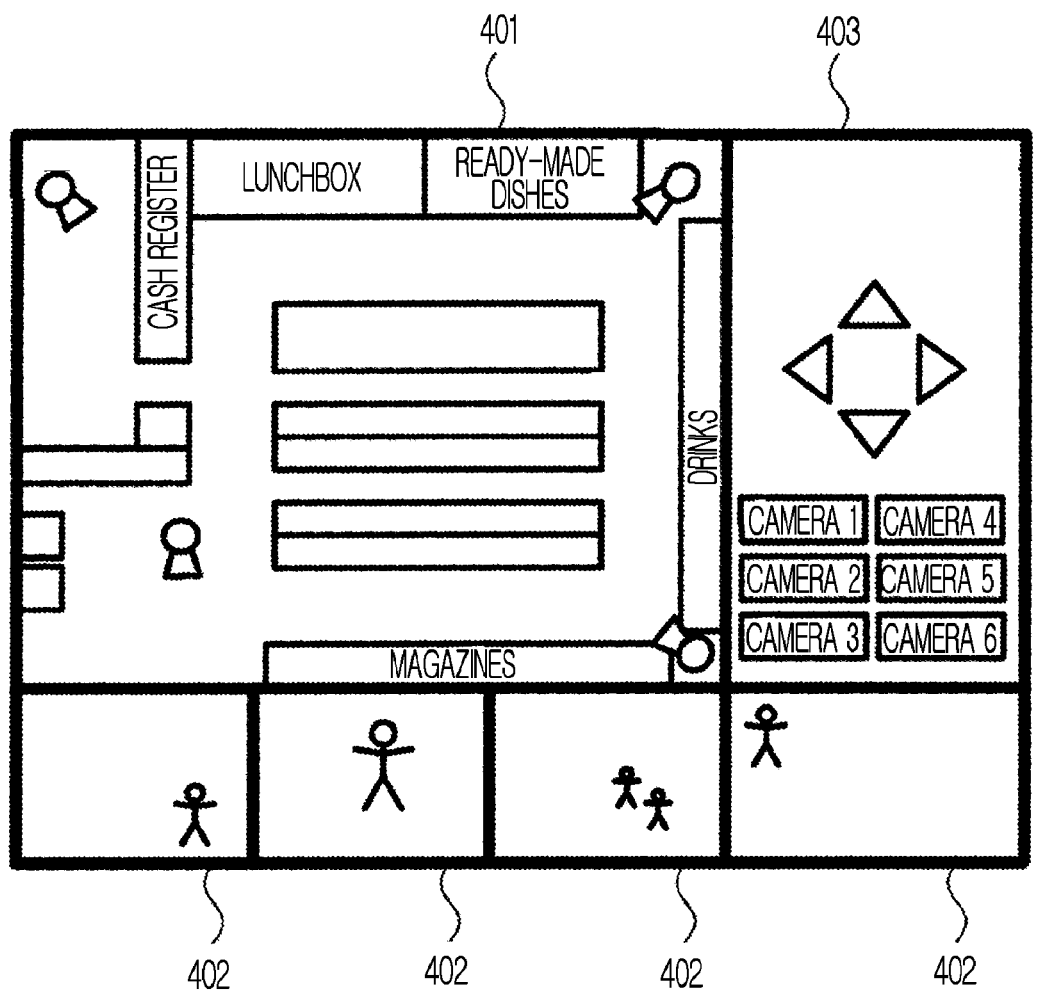
FIG. 4 shows an example of an output image in the camera control terminal.

The composition processing unit 207 composes output image data using the captured image data that is decoded by the decoding processing unit 202, and the map data and the camera position data that are stored in the storage unit 206. An example of the composited output image is shown in FIG. 4. The composition processing unit 207 composes a map 401 in which a camera icon is composed with the position of the camera on the map, captured image data 402 that is reduced in size, and a panel 403 for controlling a camera to thereby compose the output image data.

An output unit 208 outputs the output image data that is composed by the composition processing unit 207. Since an image display device 40, such as a liquid crystal monitor or a projector, is connected to the output unit 208, the output image data that is output by the output unit 208 is displayed on the image display device 40.

The operation unit 209 is constituted by a mouse, a touch panel, a keyboard, or the like, and thus an operator operates an operating panel using the operation unit 209 while viewing a captured image displayed on the image display device 40 to give various instructions.

For example, control buttons, such as a panning control button, a tilting control button, and a zooming control button, are disposed in the operating panel so that an operator selects these control buttons in the operation unit 209. Then, the panning data processing unit 203 calculates panning instruction data for changing a panning direction and transmits the calculated panning instruction data to the communication unit 201, the tilting data processing unit 204 calculates tilting instruction data for controlling a tilting direction and transmits the calculated tilting instruction data to the communication unit 201, or the zooming data processing unit 205 calculates zooming instruction data for changing a focal distance of a zoom lens and transmits the calculated zooming instruction data to the communication unit 201.

As another example, a plurality of preset position buttons are disposed in an output image, and a panning angle, a tilting angle, and a focal distance of a zoom lens are stored in the storage unit 206 in advance in association with each of the preset position buttons. When the operator selects the preset position buttons in the operation unit 209, the panning data processing unit 203, the tilting data processing unit 204, and the zooming data processing unit 205 read out the panning angle, the tilting angle, the focal distance of a zoom lens that are stored in the storage unit 206 from the storage unit 206, and transmit the panning angle, the tilting angle, the focal distance of a zoom lens as the panning instruction data, the tilting instruction data, and the zooming instruction data to the communication unit 201.

[Configuration of Monitoring System]

Figure 3:
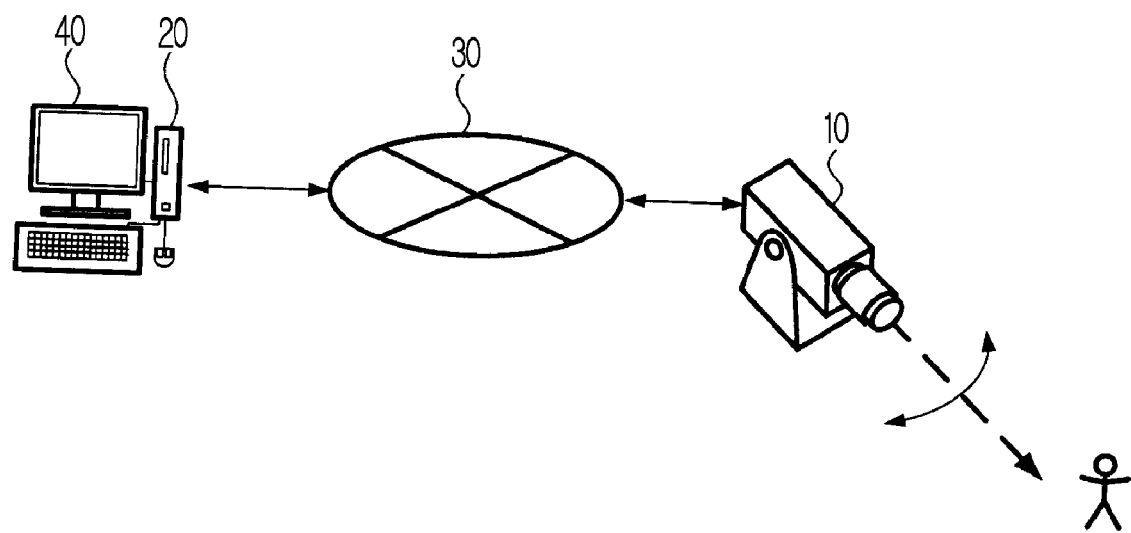
FIG. 3 is a schematic system configuration diagram showing a configuration of a monitoring system using the network camera according to an embodiment of the present invention.

A monitoring system using the network camera 10 and the camera control terminal 20 of the present embodiment will be described with reference to FIG. 3. The monitoring system of FIG. 3 is an example of a monitoring system that monitors a monitoring area, for example, the inside of a store. The monitoring system has the network camera 10 for monitoring the inside of a store, and the camera control terminal 20 that controls zooming, panning, and tilting of the network camera 10 and via which an image captured by the network camera 10 is browsed. The image display device 40, such as a liquid crystal monitor or a projector that displays image data that is output by the camera control terminal 20 is connected to the camera control terminal 20. For convenience of description, only one network camera 10 is disposed, but a plurality of the network cameras 10 may be disposed.

The network camera 10 is attached to a ceiling, a high place on a wall, or the like so as to look down the inside of the store. The camera control terminal 20 may be installed in a security company at a remote location, may be installed inside the same store as the network camera 10, or may be installed in a security office.

A network 30 is constituted by a network device, such as a router or a hub. The network camera 10 and the camera control terminal 20 are connected to the network 30 via a Local Area Network (LAN) cable, and the network camera 10 and the camera control terminal 20 communicate with each other via the network 30. In addition, the communication between the network camera 10 and the camera control terminal 20 is not limited to communication through a LAN cable, and may be performed through any of various other means, such as a wireless LAN or a cellular phone line.

[Example of Determination of Ordinary Mode/Failure Mode]

Figure 5:
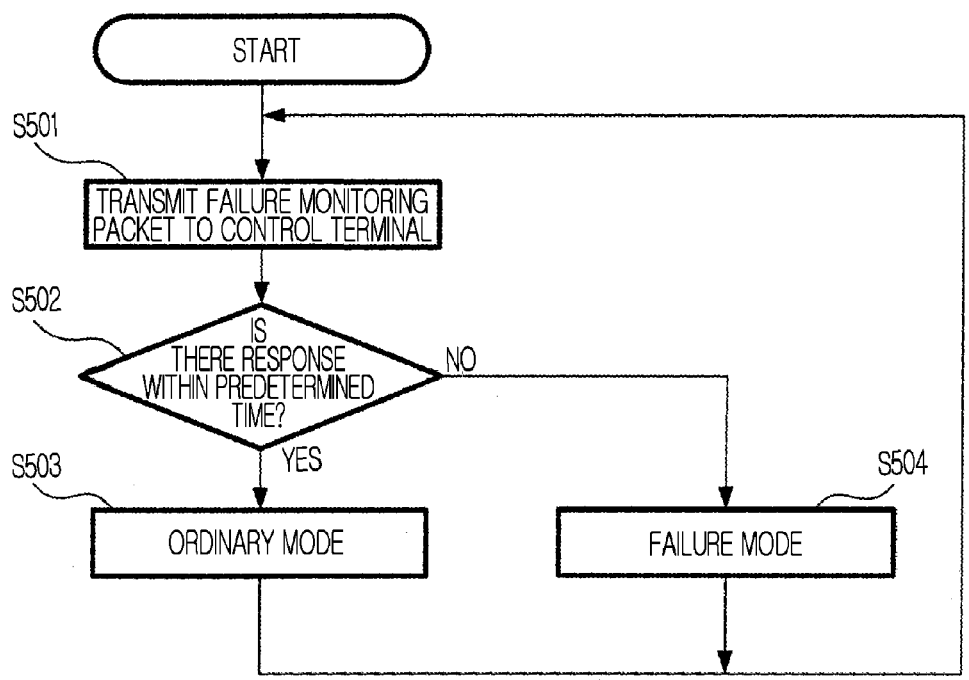
FIG. 5 is a flowchart showing a failure monitoring in the network camera according to an embodiment of the present invention.

It is assumed that the network camera 10 of the present embodiment is operated in any one mode of an ordinary mode and a failure mode, in accordance with an instruction of the control unit 104. A flowchart showing the mode selection of the control unit 104 is shown in FIG. 5. The control unit 104 of the network camera 10 causes the communication unit 103 to perform a failure monitoring of the camera control terminal 20 all the time (step S501). Simply, the failure monitoring may be configured to transmit a ping command to determine whether or not there is a response. More exactly, the failure monitoring may be configured to receive a response to transmission of captured image data from the camera control terminal 20 to confirm the response every time when the captured image data is transmitted. When there is a response from the camera control terminal 20 within a predetermined time with respect to the transmission for the failure monitoring (step S502: YES), the control unit 104 is operated in an ordinary mode (step S503). Otherwise, when there is no response even though a predetermined time has elapsed from the transmission for the failure monitoring (step S503: NO), the control unit 104 determines that a failure occurs in a network, and thus enters a failure mode (step S504). The control unit 104 returns to step S501 in any case and continues the failure monitoring of the camera control terminal 20. In the failure mode, when the response is returned from the camera control terminal 20 within a predetermined response time with respect to the transmission for the failure monitoring, the control unit 104 stops the failure mode and returns to the ordinary mode.

[Example of Operation in Ordinary Mode]

Next, an example of the ordinary mode, that is, an example of an operation when a failure does not occur in a network, will be described. In normal times, a manual monitoring is performed with the network camera 10. In other words, an operator gives instructions for panning, tilting, and zooming to the network camera 10, by operating the camera control terminal 20 while viewing the image display device 40. An image captured by the network camera 10 is displayed on the image display device 40. In the network camera 10, the communication unit 103 receives an instruction from the camera control terminal 20 via the network 30. When the communication unit 103 receives an panning instruction, the control unit 104 controls the camera platform driving unit 105 in response to the instruction to cause panning to be performed, and when an output of the panning angle sensor 106 reaches an instructed panning angle, the control unit 104 causes the panning by the camera platform driving unit 105 to be stopped. When the communication unit 103 receives a tilting instruction, the control unit 104 controls the camera platform driving unit 105 in response to the instruction to cause tilting to be performed, and when an output of the tilting angle sensor 107 reaches an instructed tilting angle, the control unit 104 controls the tilting of the camera platform driving unit 105 to be stopped. When the communication unit 103 receives a zooming instruction, the control unit 104 drives the zoom lens 108 in response to the instruction to cause zooming to be performed, and when an output of the zooming sensor 109 reaches an instructed focal distance, the control unit 104 causes the driving of the zoom lens 108 to be stopped.

In this manner, the control unit 104 changes a view angle in response to instructions. The imaging unit 101 captures an image at the changed view angle and transmits the captured image to the compression unit 102. The compression unit 102 digitally compresses the image into a JPEG format or the like, and transmits the compressed image to the communication unit 103. The communication unit 103 transmits the transmitted compressed image to the camera control terminal 20.

When the camera control terminal 20 receives the transmitted image, the camera control terminal 20 decodes the image and causes the image to be displayed on the image display device 40.

The network camera 10 of the present embodiment also stores view angle changing instruction information for sequentially imaging and recording a plurality of monitoring points when a failure occurs in a network. In the present embodiment, the view angle changing instruction information is referred to as a cyclic sequence during a failure, and it is assumed that the cyclic sequence during a failure is stored in the cyclic storage unit 110 in advance. An example of the cyclic sequence during a failure is shown in FIGS. 6A and 6B. Similarly to the instruction data in an ordinary automatic monitoring, the cyclic sequence is constituted by a plurality of pieces (three pieces in FIG. 6A) of instruction data (a set of instruction values of panning, tilting, and zooming) as shown in, for example, FIG. 6A, and holding times of the plurality of pieces of instruction data. In the No. 1 instruction data, a panning angle is set to p1, a tilting angle is set to t1, a focal distance of a zoom lens is set to z1, and a holding time is set to T1.

[Example of Operation in Failure Mode]

When there is no response even when a predetermined time has elapsed from the transmission for the failure monitoring as described above, the control unit 104 of the network camera 10 determines that a failure occurred in a network and enters a failure mode.

Figure 7:
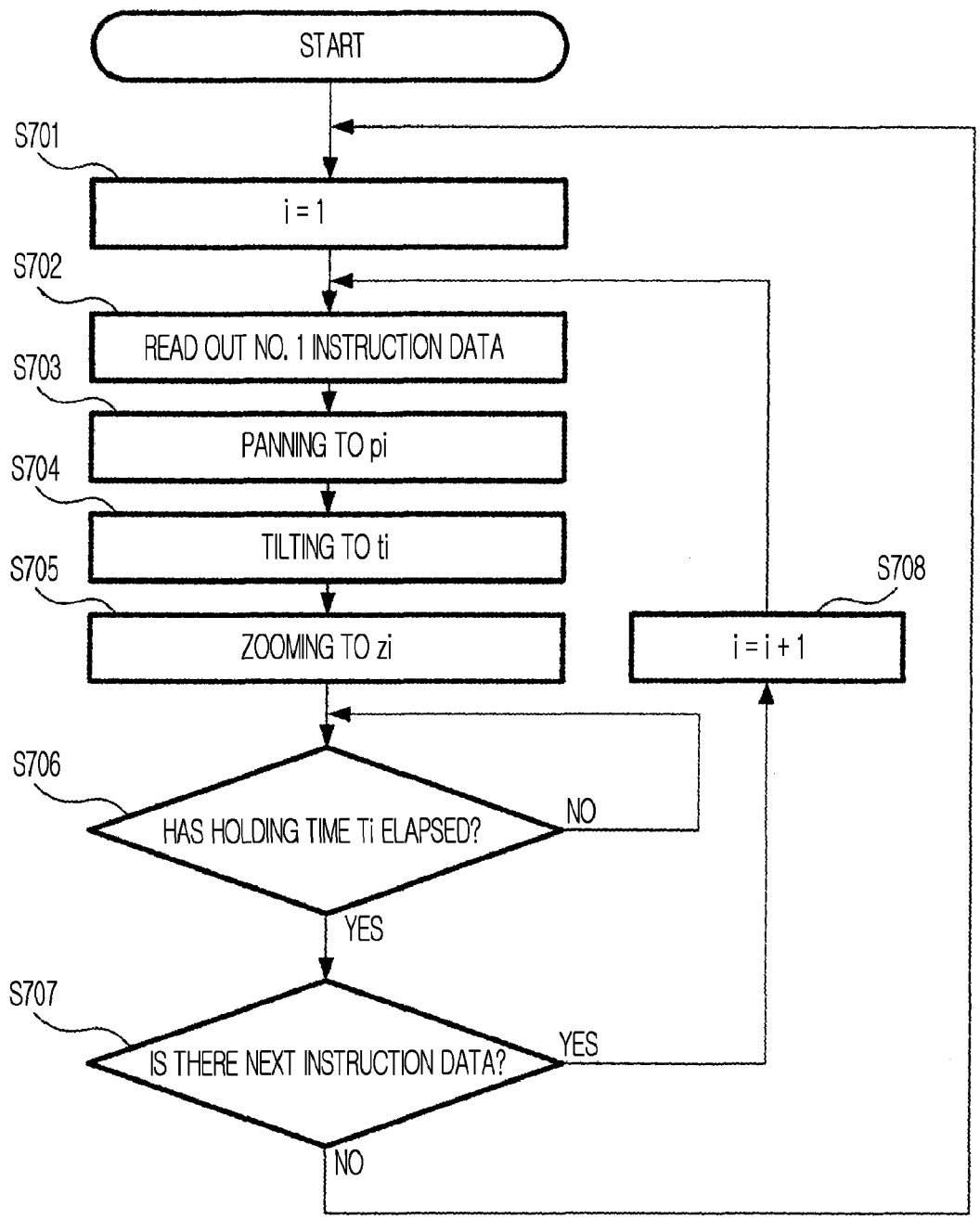
FIG. 7 is a flowchart of a first example of a cyclic monitoring according to a cyclic sequence when a failure occurs in the network camera according to an embodiment of the present invention.

A flowchart of the control unit 104 in the failure mode is shown in FIG. 7. When the control unit 104 enters the failure mode, the control unit 104 first sets a counter to 1 (step S701), and reads out the No. 1 instruction data in the cyclic sequence during a failure, which is recorded in the cyclic storage unit 110 (step S702). When the control unit 104 reads out the No. 1 instruction data, the control unit 104 drives the camera platform driving unit 105 to cause the camera platform driving unit 105 to perform panning. When an output of the panning angle sensor 106 conforms to the instruction value p1 of panning, the control unit 104 causes the panning through the camera platform driving unit 105 to be stopped (step S703). Similarly, the control unit 104 drives the camera platform driving unit 105 to cause the camera platform driving unit 105 to perform tilting. When an output of the tilting angle sensor 107 conforms to the instruction value t1 of tilting, the control unit 104 causes the tilting through the camera platform driving unit 105 to be stopped (step S704). In addition, the control unit 104 drives the zoom lens 108 to cause the zoom lens 108 to perform zooming, and when an output of the zooming sensor 109 conforms to the instruction value z1 of zooming, the control unit 104 causes the zooming through the zoom lens 108 to be stopped (step S705). In this manner, a view angle is changed to the view angle recorded in the instruction data.

The control unit 104 measures a time after changing the view angle. When the time reaches the holding time T1 (step S706: YES), the control unit 104 confirms whether or not the next instruction data is present (step S707). When the next instruction data is present (step S707: YES), the control unit 104 increments the counter by one (step S708) to return to step S702, and reads out the next instruction data. Hereinafter, similarly, the process is performed, and when there is no next instruction data (step S707: NO), the process returns to step S701 to set the counter to 1 and continues.

When the control unit 104 enters the failure mode, the control unit 104 causes the image that is captured by the imaging unit 101 and is compressed by the compression unit 102 to be recorded in the image storage unit 111. Thus, the image storage unit 111 records images which are captured while circulating based on the plurality of pieces of instruction data that are stored as the cyclic sequence during a failure. The recording of the images is performed by recording a JPEG still image at predetermined intervals or recording an MPEG-4 stream. A bit rate of recording may be the same as in the ordinary mode, or the bit rate of recording in the failure mode may be lower than that in the ordinary mode.

When a failure that occurred in a network is removed, the image recorded in the image storage unit 111 in this manner may be transmitted through stream delivery or file transfer, in accordance with requests from the camera control terminal 20. Thus, it may be confirmed through the image whether or not something strange occurs in a monitoring area while the failure is occurring in the network, and an evidence image may be stored in the camera control terminal 20.

It is also preferable to record the cyclic sequence during a failure not only in a network camera with which a manual monitoring is performed but also in a network camera that performs an automatic monitoring. Monitoring is not necessary in normal times, but if a monitoring point that is likely to be related to a network failure, for example, an imaging direction for imaging a network device and a power device, is added to the cyclic sequence during a failure and images of the network device and the power device are recorded, it may help to ascertain the cause of the network failure.

[Example of Auto Panning in Failure Mode]

Next, as another example of the cyclic sequence during a failure, an auto panning will be described. In the auto panning, as shown in 6B, the cyclic sequence during a failure is constituted by a panning start angle ps, a panning end angle pe, an auto panning driving speed d between the panning starting angle ps and the panning end angle pe, a tilting angle tt, and a focal distance zz of a zoom lens. Here, it is assumed that the panning start angle ps indicates a left panning angle of the auto panning, and that the panning end angle pe indicates a right panning angle of the auto panning.

Figure 8:
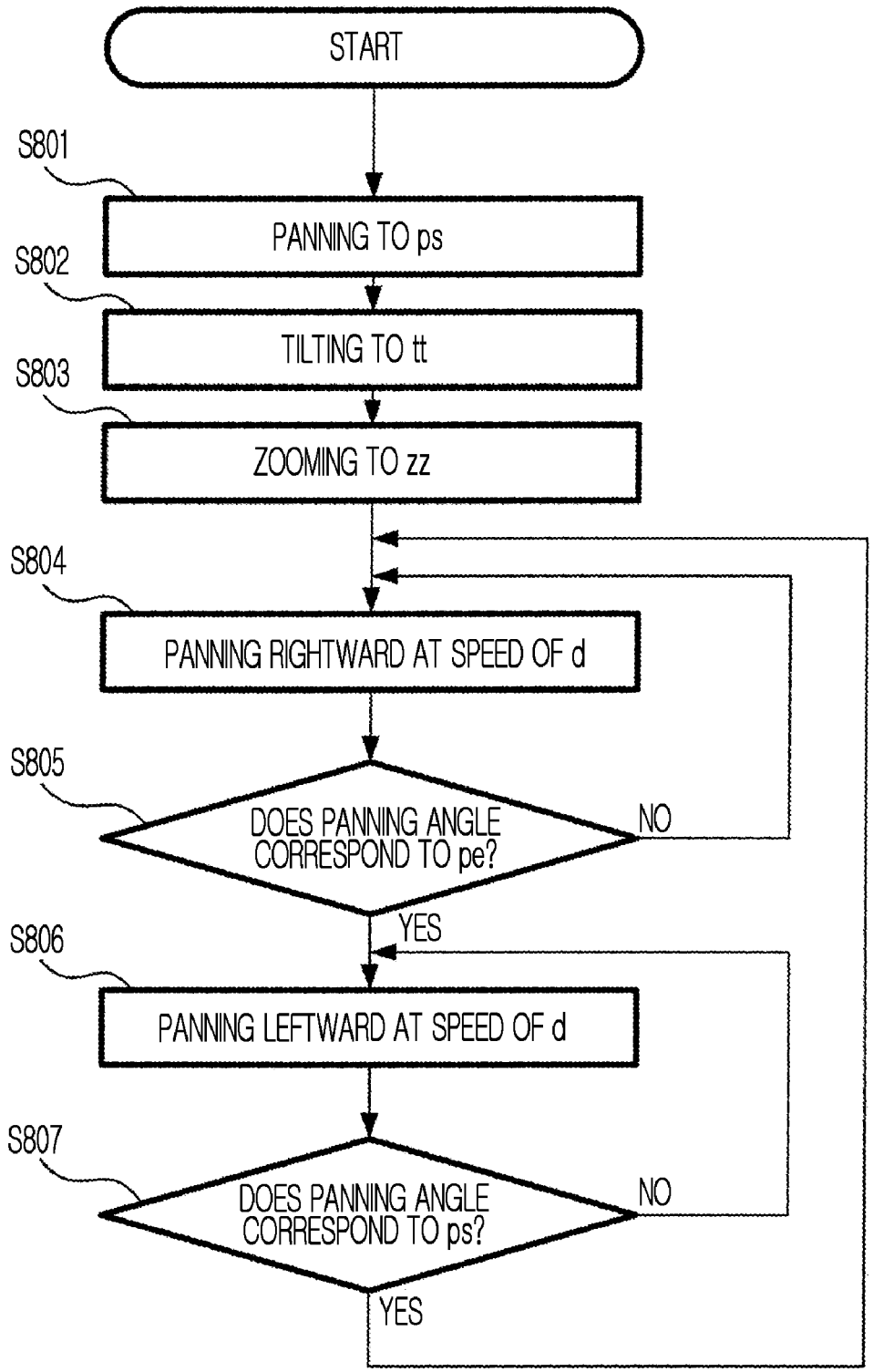
FIG. 8 is a flowchart of a second example of a cyclic monitoring according to a cyclic sequence when a failure occurs in the network camera according to an embodiment of the present invention.

When the control unit 104 enters a failure mode, the control unit 104 reads out the cyclic sequence during a failure which is recorded in the cyclic storage unit 110. A flowchart of the control unit 104 during an auto panning is shown in FIG. 8. First, the control unit 104 sets an imaging direction to an initial location. The control unit 104 drives the camera platform driving unit 105 to perform panning, and when an output of the panning angle sensor 106 conforms to the panning start angle ps of the cyclic sequence during a failure, the control unit 104 stops the panning (step S801). Similarly, the control unit 104 drives the camera platform driving unit 105 to perform tilting, and when an output of the tilting angle sensor 107 conforms to the tilting angle tt of the cyclic sequence during a failure, the control unit 104 stops the tilting (step S802). Similarly, the control unit 104 drives the zoom lens 108 to perform zooming, and when an output of the zooming sensor 109 conforms to the focal distance zz of a zoom lens of the cyclic sequence during a failure, the control unit 104 stops the zooming (step S803). In this manner, the control unit 104 sets a panning angle, a tilting angle, and a focal distance of a zoom lens to be the panning start angle ps, the tilting angle tt, and the focal distance zz that are recorded in the cyclic sequence during a failure.

Next, the control unit 104 starts an auto panning. In other words, the control unit 104 sends the auto panning driving speed d that is stored in the cyclic sequence during a failure to the camera platform driving unit 105, and causes the camera platform driving unit 105 to be panned to the right at the auto panning driving speed d (step S804). When a value of the panning angle sensor 106 conforms to the panning end angle pe (step S805: YES), the control unit 104 causes a driving direction of the panning of the camera platform driving unit 105 to be reversed, and thus the control unit 104 causes the camera platform driving unit 105 to be panned to the left at the auto panning driving speed d (step S806).

When a value of the panning angle sensor 106 conforms to the panning start angle ps (step S807: YES), the process returns to step S804. Thus, the control unit 104 causes the driving direction of the panning of the camera platform driving unit 105 to be reversed again, and thus the control unit 104 causes the camera platform driving unit 105 to be panned to the right at the auto panning driving speed d. In this manner, the control unit 104 causes the camera platform driving unit 105 to reciprocate at the auto panning driving speed d between the panning start angle ps and the panning end angle pe. When the auto panning is performed in this manner, monitoring may be performed over a wide range.

A network failure may be also detected by performing a failure monitoring of the network camera 10 in the camera control terminal 20. The camera control terminal 20 calculates a maximum recording time during a failure which is able to be recorded in the image storage unit 111, on the basis of the bit rate of the compression unit 102 of the network camera 10 and the capacity of the image storage unit 111, and records the calculated maximum recording time during a failure for each network camera 10 in the storage unit 206. When the communication unit 201 of the camera control terminal 20 detects that a failure occurs in the communication with the network camera 10, a failure continuation time from the start of the failure is counted. Then, if the failure continuation time approaches the maximum recording time during a failure of the network camera 10, for example, if a failure continuation time reaches the maximum recording time during a failure within 1 hour, a data flow warning is transmitted to the composition processing unit 207 and the data flow warning is displayed on a screen that is output from the output unit 208.

Thereby, for example, an operator may see the data flow warning that is issued for each network camera 10, rush to the scene, and connect a different communication device to obtain a line for emergency use, or may replace the image storage unit 111 that is constituted by, for example, a detachable memory card to cause recording to be continued.

[Example of Auto-Generation of Cyclic Sequence During Failure]

Figure 9:
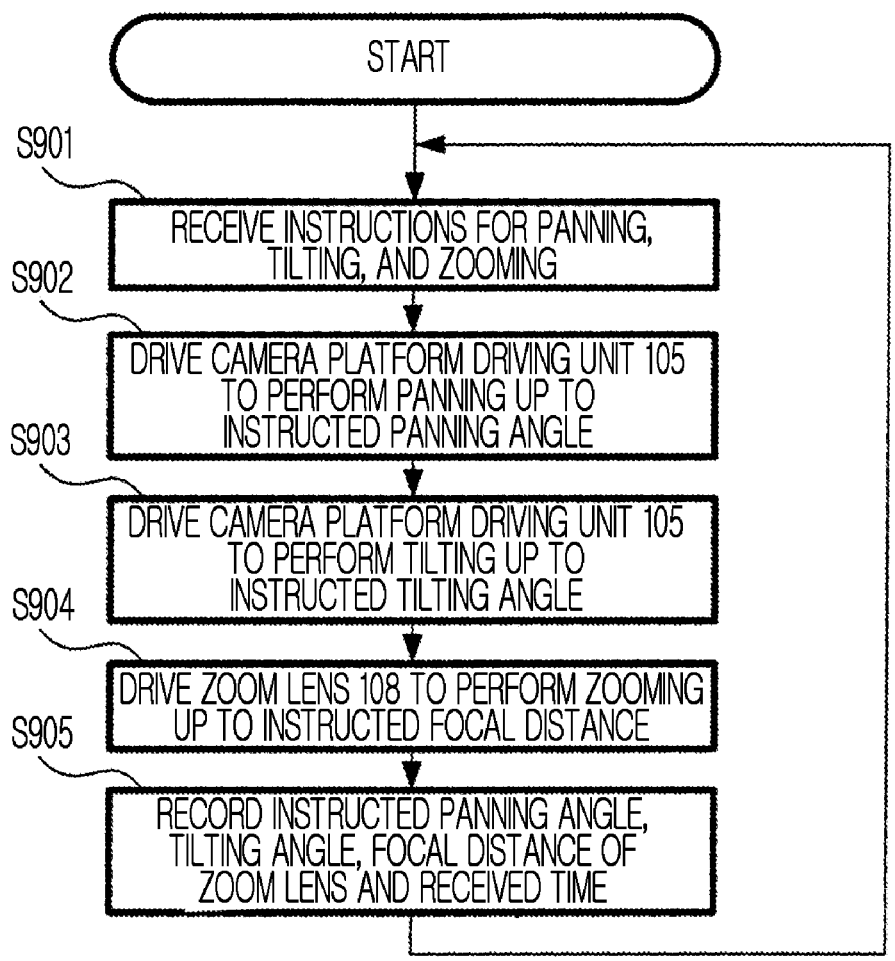
FIG. 9 is a flowchart of a third example of a cyclic monitoring according to a cyclic sequence when a failure occurs in the network camera according to an embodiment of the present invention.

An example will be described of automatically writing a cyclic sequence during a failure by storing an instruction history in an ordinary mode. A flowchart of the control unit 104 in an example of auto-generation is shown in FIG. 9. A manual monitoring is performed with the network camera 10 in normal times. In other words, an operator operates the camera control terminal 20 while viewing the image display device 40 to cause the network camera 10 to perform panning, tilting, and zooming. An image captured by the network camera 10 is displayed on the image display device 40. In the network camera 10, the communication unit 103 receives an instruction from the camera control terminal 20 via the network 30 (step S901). For example, when the network camera 10 receives a panning angle, a tilting angle, a focal distance of a zoom lens as the instructions of the panning, the tilting, and the zooming, the control unit 104 drives the camera platform driving unit 105 in response to the instruction to perform panning, and when an output of the camera platform driving unit 105 corresponds to the instructed panning angle, the control unit 104 causes the panning through the camera platform driving unit 105 to be stopped (step S902). When the network camera 10 receives the tilting instruction, the control unit 104 drives the camera platform driving unit 105 in response to the instruction to perform tilting, and when an output of the tilting angle sensor 107 corresponds to the instructed tilting angle, the control unit 104 causes the tilting through the camera platform driving unit 105 to be stopped (step S903). When the network camera 10 receives the zooming instruction, the control unit 104 drives the zoom lens 108 in response to the instruction to perform zooming, and when an output of the zooming sensor 109 corresponds to the instructed focal distance, the control unit 104 causes the zooming through the zoom lens 108 to be stopped (step S904).

At the same time, the control unit 104 records the received panning angle, tilting angle, focal distance of a zoom lens and the time when the instruction is received, as an instruction history in the cyclic storage unit 110 (step S905).

In this manner, whenever the control unit 104 receives an instruction, the control unit 104 records the contents of the instruction and the time when the instruction is received, as an instruction history. A predetermined number (for example, eleven) of instruction histories are recorded, and then an overwrite recording is performed using a First In First Out (an FIFO) method. Thus, for example, eleven instruction histories are always stored as shown in FIG. 10A.

As a result of the above-mentioned failure monitoring, when the control unit 104 enters a failure mode, the control unit 104 changes the instruction history recorded in the cyclic storage unit 110 to write a cyclic sequence during a failure. Specifically, the receiving time of the instruction history, which is already recorded, is numbered from 1 in chronological order, and the panning angle, the tilting angle, and the focal distance of a zoom lens are set as instruction data. A time obtained by subtracting the time when a first instruction history is received from the time when a second instruction history is received is set as a holding time of first instruction data. A sequential conversion is performed in this manner so as to write the cyclic sequence during a failure constituted by ten pieces of instruction data as shown in FIG. 9B. When the cyclic sequence during a failure is written, the control unit 104 performs a cyclic monitoring as shown in FIG. 7.

In this manner, if the instruction history is recorded and the cyclic sequence during a failure is written on the basis of the instruction history when a failure occurs, the trouble of previously writing the cyclic sequence during a failure is avoided. In addition, the cyclic sequence during a failure may be always generated on the basis of the latest monitoring state. Further, the same process is possible not only in a manual monitoring in which an operator manually gives instructions of panning, tilting, or zooming but also in an automatic monitoring in which the camera control terminal 20 automatically gives instructions on the basis of a program, or the like.

[Second Example of Auto-Generation of Cyclic Sequence During Failure]

Hereinafter, a case will be further described where instructions for panning, tilting, and zooming are instructions on directions and speeds of the panning, the tilting, and the zooming instead of the instructions on a panning angle, a tilting angle, and a zooming angle. If an instruction for a view angle is given using a direction or a speed and a cyclic sequence during a failure is generated by using a part of the instruction, there is no angle serving as a standard, and thus a correct view angle may not be set. Therefore, in a second example, in addition to the instruction history, information regarding the view angle when the instruction is received is recorded and used as a first instruction data of the cyclic sequence.

When the network camera 10 receives an instruction to change a view angle using a panning driving direction, a panning driving speed, a tilting driving direction, a tilting driving speed, a zoom lens driving direction, and a zoom lens driving speed, from the camera control terminal 20, the control unit 104 of the network camera 10 drives the camera platform driving unit 105 in response to the instructed panning driving direction and panning driving speed to perform panning. In addition, the control unit 104 drives the camera platform driving unit 105 in response to the instructed tilting driving direction and tilting driving speed to perform tilting. The control unit 104 drives the zoom lens 108 in response to the instructed zoom lens driving direction and driving speed to perform zooming. At the same time, the control unit 104 records the instructed panning driving direction, panning driving speed, tilting driving direction, tilting driving speed, zoom lens driving direction, zoom lens driving speed and the time when the instruction is received, as an instruction history. In addition, the control unit 104 records a panning angle, a tilting angle, a focal distance of a zoom lens at the time when the instruction is received, together with the instruction history. A predetermined number (for example, eleven) of instruction histories are recorded, and then an overwrite recording is performed using a FIFO method. An example of the recorded instruction history is shown in FIG. 11A. Instead of instructions for all the direction and speed of panning, tilting, and zooming, an instruction for any one direction and any one speed may be given.

As a result of the above-mentioned failure monitoring, when the control unit 104 enters a failure mode, the control unit 104 changes the instruction history recorded in the cyclic storage unit 110 to write a cyclic sequence during a failure. Specifically, a panning angle, a tilting angle, and a focal distance of a zoom lens of the oldest instruction history are set as No. 1 instruction data. In the No. 1 instruction data, a holding time is set to 0. Panning, tilting, and zooming directions and panning, tilting, and zooming speeds of the second oldest instruction history are set as No. 2 instruction data. In the No. 2 instruction data, a holding time is set to be a time difference between No. 1 and No. 2, that is, (T1002-T1001). Hereinafter, sequentially, the instruction data is written up to No. 10. In this manner, the panning angle, the tilting angle, and the focal distance of a zoom lens are set as the first instruction data of the cyclic sequence during a failure, and then the cyclic sequence during a failure constituted by instruction data as shown in FIG. 11B is written by using the directions and speeds of panning, tilting, and zooming of the instruction history as instruction data. Thereby, even when an instruction to change a view angle is given by using a direction or a speed, a cyclic monitoring according to a history may be performed even during a failure.

[Third Example of Auto-Generation of Cyclic Sequence During Failure]

Similarly to the second example, with respect to a case where instructions for panning, tilting, and zooming are instructions on directions and speeds of the panning, the tilting, and the zooming instead of instructions on a panning angle, a tilting angle, and a zooming angle, a third example of automatically generating a cyclic sequence during a failure will be described. In the case that an instruction for a view angle is given by using a direction or a speed, even though information regarding the view angle is used as first instruction data, if the direction or speed of the panning or tilting does not move as instructed due to a variation or the like, the view angle deviates. When a change in view angle is repeated, the deviation is accumulated. Therefore, in the third example, an operation history (view angle history) when the view angle is changed in response to an instruction is recorded instead of the instruction history, and the view angle history is used as instruction data of the cyclic sequence.

Similarly to the second example, the control unit 104 changes a view angle in response to an instruction. At the same time, the control unit 104 records view angle data constituted by an output of the panning angle sensor 106, an output of the tilting angle sensor 107, and an output of the zooming sensor 109, together with the time, as an operation history, at a predetermined time interval (for example, 1 second). A predetermined number (for example, sixty) of instruction histories are recorded, and then an overwrite recording is performed using a FIFO method. In the third example, the predetermined number may be more than that of the second example. An example of the instruction and an example of the recorded operation history are shown in FIG. 12A and FIG. 12B, respectively.

As a result of the above-mentioned failure monitoring, when the control unit 104 enters a failure mode, the control unit 104 changes the instruction history recorded in the cyclic storage unit 110 to write a cyclic sequence during a failure. Specifically, the time when the recorded instruction history is received is numbered from 1 in chronological order. A time obtained by subtracting a first time from a second time is set as a holding time of first instruction data. A sequential conversion is performed in this manner so as to write the cyclic sequence during a failure as shown in FIG. 12C. When the cyclic sequence during a failure is written, the control unit 104 performs a cyclic monitoring as shown in FIG. 5.

Thus, in a case where an instruction to change a view angle is given by using a direction or a speed, even though a speed of the camera platform driving unit 105 is uneven, a cyclic monitoring according to a history during a failure may be performed without causing a deviation of the view angle, and further, without accumulating a deviation of the view angle.

In addition, the present invention includes programs for a computer to execute functions of the above-mentioned device. These programs may be read out from a recording medium and embedded in the computer, or may be transmitted via a communication network and embedded in the computer.

According to an imaging device and an imaging method of the present invention, even when a failure occurs in a network, an appropriate image may be recorded.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An imaging device comprising:
   an imaging unit which captures an image;
   a transmission unit which transmits the image captured by the imaging unit via a network;
   a reception unit which receives instructions to change a view angle of the imaging unit, from another device via the network;
   a view angle changing unit which changes the view angle of the imaging unit, on the basis of the instructions to change a view angle, which is received by the reception unit;
   a view angle changing instruction information storage unit which stores view angle changing instruction information for instructing a change in view angle;

a failure monitoring unit which detects that a failure occurred in communication with the another device;

a control unit which instructs the view angle changing unit to change the view angle of the imaging unit on the basis of the view angle changing instruction information stored in the view angle changing instruction information storage unit, according to the detection of the failure monitoring unit; and an image storage unit which stores the image captured by the imaging unit, according to the detection of the failure monitoring unit.

2. The imaging device of claim 1, further comprising a changed history storage unit which stores a history of the instructions to change a view angle which are received from the another device, wherein the control unit further generates view angle changing instruction information on the basis of the history of the instructions to change a view angle which are stored in the changed history storage unit, according to the detection of the failure monitoring unit, and stores the generated view angle changing instruction information in the view angle changing instruction information storage unit.

3. The imaging device of claim 1, further comprising an operation history storage unit which stores a history of operations of the view angle changing unit, wherein the control unit further generates view angle changing instruction information on the basis of the history of operations which is stored in the operation history storage unit, according to the detection of the failure monitoring unit, and stores the generated view angle changing instruction information in the view angle changing instruction information storage unit.

4. An imaging method comprising:

an image capture step of capturing an image;

a transmission step of transmitting the image captured in the image capture step via a network;

a reception step of receiving instructions to change a view angle of the image captured in the image capture step, from another device via a network;

a first view angle changing step of changing the view angle of the image captured in the image capture step, on the basis of the instructions to change a view angle which are received in the reception step;

a view angle changing instruction information storage step of storing view angle changing instruction information for instructing to change the view angle;

a failure monitoring step of detecting that a failure occurred in communication with the another device;

a second view angle changing step of changing the view angle of the image captured in the image capture step on the basis of the view angle changing instruction information stored in the view angle changing instruction information storage step, according to the detection in the failure monitoring step; and an image storage step of storing the image captured in the image capture step, according to the detection in the failure monitoring step.

5. The imaging method of claim 4, further comprising a changed history storage step of storing a history of instructions to change a view angle, which are received from the another device, wherein the view angle changing instruction information storage step further generates and stores view angle changing instruction information on the basis of the history of the instructions to the view angle which are stored in the changed history storage step, according to the detection in the failure monitoring step.

* * * * *